Figure 1:
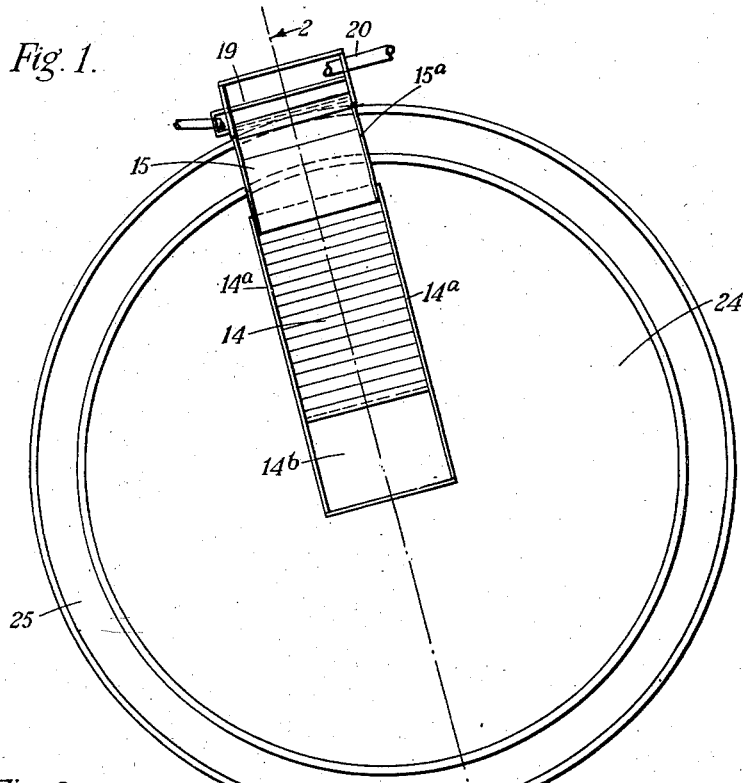

Dec. 26, 1944.  F. N. PICKETT  2,366,052
PRODUCTION OF MAGNESIUM HYDROXIDE
Filed Aug. 12, 1941  5 Sheets-Sheet 1

INVENTOR
Francis Norman Pickett
BY Sager & Malcolm
ATTORNEYS

Dec. 26, 1944. F. N. PICKETT 2,366,052
PRODUCTION OF MAGNESIUM HYDROXIDE
Filed Aug. 12, 1941 5 Sheets-Sheet 2

INVENTOR
Francis Norman Pickett
BY Sager & Malcolm
ATTORNEYS

Dec. 26, 1944.   F. N. PICKETT   2,366,052
PRODUCTION OF MAGNESIUM HYDROXIDE
Filed Aug. 12, 1941   5 Sheets-Sheet 3

INVENTOR
Francis Norman Pickett
BY Sager & Malcolm
ATTORNEYS

Dec. 26, 1944.　　　　F. N. PICKETT　　　　2,366,052
PRODUCTION OF MAGNESIUM HYDROXIDE
Filed Aug. 12, 1941　　　5 Sheets-Sheet 4

INVENTOR
Francis Norman Pickett
BY
Sager & Malcolm
ATTORNEYS

Dec. 26, 1944.     F. N. PICKETT     2,366,052
PRODUCTION OF MAGNESIUM HYDROXIDE
Filed Aug. 12, 1941     5 Sheets-Sheet 5
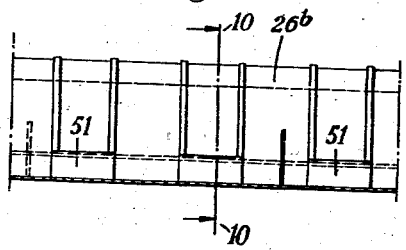
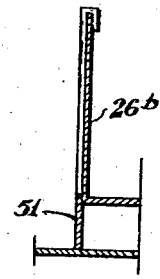
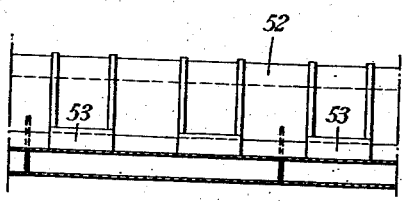
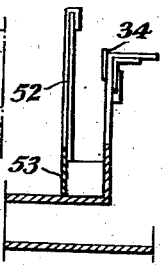
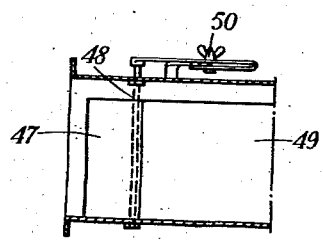
INVENTOR
Francis Norman Pickett
BY Sager & Malcolm
ATTORNEYS Patented Dec. 26, 1944

2,366,052

UNITED STATES PATENT OFFICE 2,366,052

PRODUCTION OF MAGNESIUM HYDROXIDE

Francis Norman Pickett, Tenterden, England, assignor to Ocean Salts (Products) Limited, London, England Application August 12, 1941, Serial No. 406,467
In Great Britain June 17, 1940

2 Claims. (Cl. 23—201)

This invention relates generally to the production of magnesium hydroxide from brines and like liquors containing convertible magnesium salts, by processes of the type comprising the reaction of a base, such as milk of lime or caustic soda with, for instance, sea water. As a result of such reaction magnesium hydroxide is precipitated which in processes hitherto proposed is usually separated from the mother liquor by means of treatment in thickeners.

A difficulty in connection with most of the known methods is to secure a thorough mixing of the two liquors without at the same time producing a precipitate having a settling rate in the mother liquor so low as to render its separation and recovery uneconomical.

It is an object of the present invention to provide a process for the production of magnesium hydroxide which will enable rapid separation of the precipitate from the brine or like mother liquor.

According to the invention a process for the production of magnesium hydroxide from liquors containing convertible magnesium salts by precipitation with a basic-reacting liquor comprises bringing together in a substantially horizontal plane converging streams of the liquors flowing one above the other, the width of each stream being substantially the same as the other and being considerably greater than the depth or thickness thereof and the rate of flow in each case being adjusted according to the respective concentration of magnesium salts and base so that the mixed liquors are substantially free from magnesium ions.

Where the base employed is calcium hydroxide it may be desirable to adjust the rate of flow or the concentration of the liquors so that the mixed liquors will contain a very slight excess of the magnesium liquor in order to ensure that no free lime is brought down with the magnesium hydroxide.

According to one method of carrying the invention into effect which has been found to give particularly satisfactory results, the stream of one of the liquors is caused to fall a short distance (for example two to three inches) into a stream of the other liquor and it has been found desirable that the depth of each of the streams should not be more than about 1 inch, and preferably not more than half-an-inch, but the width may be several feet according to the volume of liquor to be handled.

The invention also provides means for conducting the mixed liquors to a settling tank (which may be in the form of an inverted cone) in order to bring about rapid settling and consequently rapid separation of the precipitate from the mother liquor. Such means may comprise a shallow trough arranged substantially horizontally and preferably of the same width as the stream at the plane of confluence. This trough is arranged to receive the mixed liquors at one end and at the other end is provided with an opening at the bottom. The trough is arranged at the top of a settling tank so that the opening in the bottom is at substantially the same level as the surface of the liquor in the settling tank and is positioned above the centre of the settling tank.

One form of apparatus for carrying out the process comprises a trough arranged so as to be very slightly inclined to the horizontal. Preferably contiguous with the upper end of the trough a mixing tray is disposed and the liquors are supplied to the mixing tray in shallow streams, a stream of one of the liquors flowing over the upper edge of a substantially vertical plate or weir located at the upper end of the mixing tray while a stream of the other liquor flows beneath the plate or weir. The lower stream flows on to the mixing tray substantially without fall and there is preferably a fall of about three inches between the edge of the weir and the mixing tray. The upper stream, therefore, will fall approximately three inches to the plane of confluence of the streams. The trough extends radially over a circular settling tank in the form of an inverted cone and so that an opening in the bottom near the end of the said trough is situated immediately above the apex of the conical bottom of the tank and at such a level that when the tank is filled to the brim with liquid the surface of the latter is at the same level as the bottom of the said second trough.

In operation the sea water may be caused to overflow the plate or weir and falls the short distance of approximately three inches into the milk of lime liquor flowing beneath the plate or weir at mixing tray level. If desired, however, the reverse procedure may be adopted, the milk of lime overflowing the weir and the sea water flowing on to the mixing tray at substantially tray level. The mixed liquors pass from the mixing tray and flow along the trough in a shallow stream to the end of the trough above the apex of the conical settling tank. By this time the rate of flow of the mixed liquors has been reduced almost to a standstill by contact with stationary water in the trough, so that the suspended magnesium hydroxide quietly settles and falls through the opening in the trough and is collected at the apex of the settling tank which may be provided with a suitable opening for withdrawal of the magnesium hydroxide sludge.

It will be understood that the basic features of the aforesaid construction of apparatus are of importance in carrying out the process of the invention. More specifically, therefore, the invention contemplates a process for the production of magnesium hydroxide according to which a shallow stream of brine containing convertible magnesium salts or a shallow stream of milk of lime is caused to flow over a weir into a similar stream of milk of lime or brine respectively flowing from under the bottom of the weir in a direction substantially perpendicular to the weir and the mixed streams caused to come almost to rest in a shallow trough having an opening above the conical bottom of a settling tank and at or just below the surface of the liquor when the tank is full.

In the accompanying drawings two constructions of apparatus for carrying out the process are illustrated by way of example. In the drawings—

Figure 2:
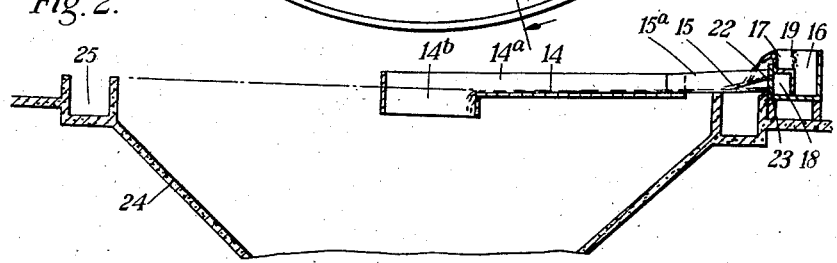
Figure 3:
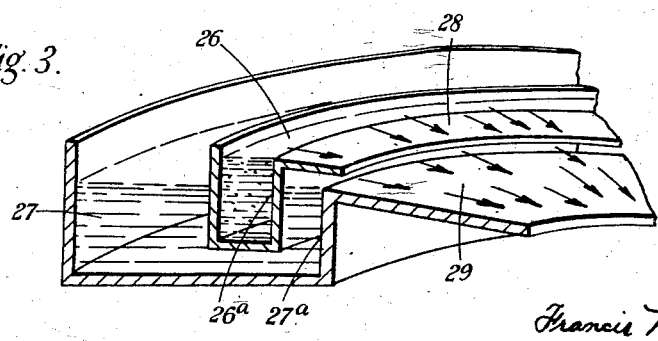
Figure 4:
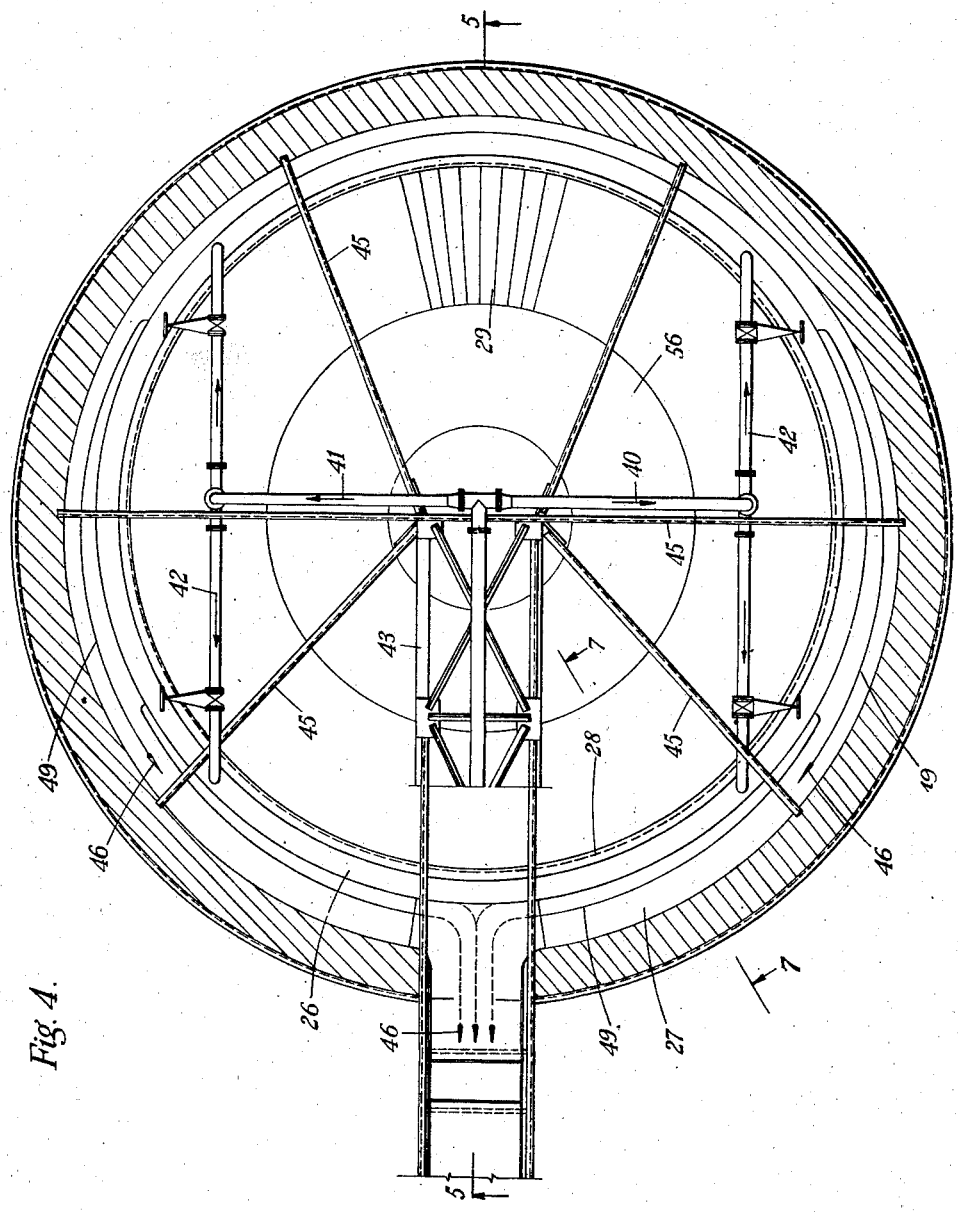
Figure 5:
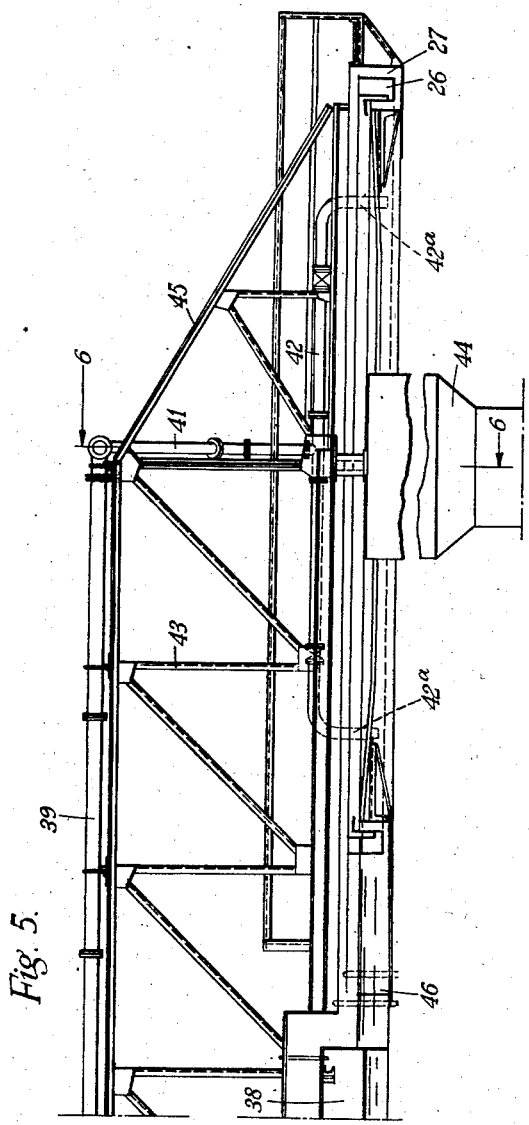
Figure 6:
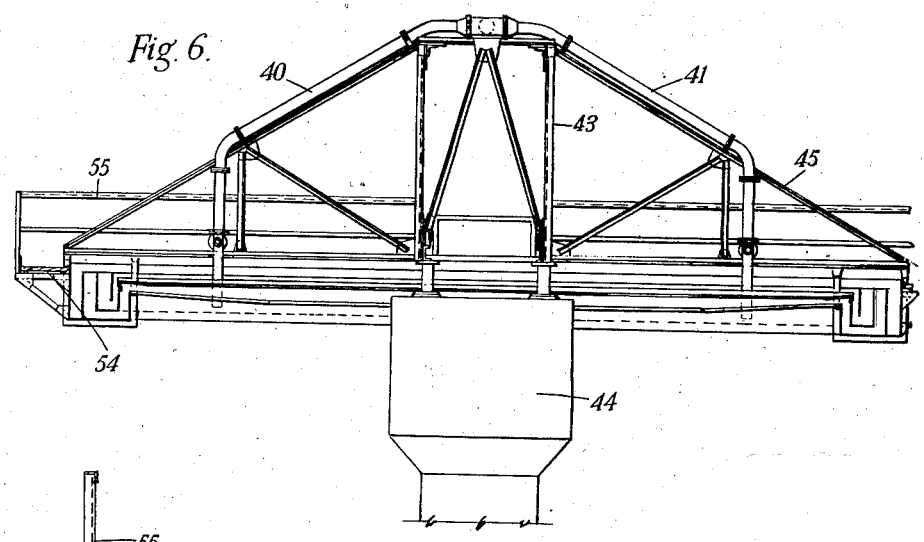
Figure 7:
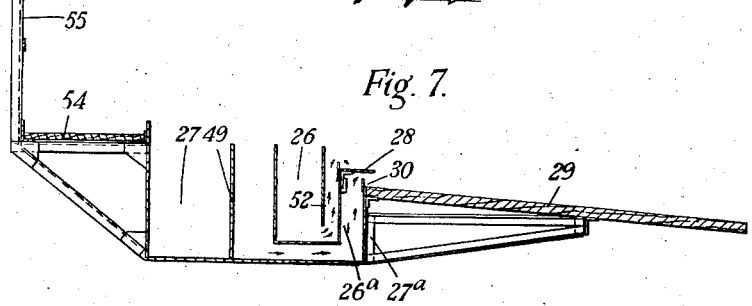
Figure 8:
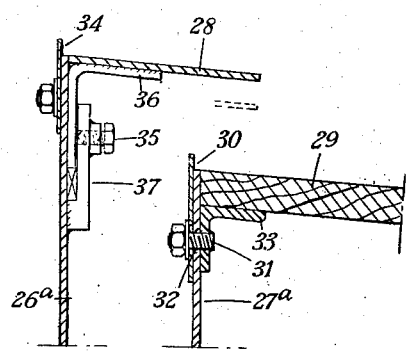

Figure 1 is a plan view of a simple construction of precipitation tank which has been designed for carrying out the invention, Figure 2 is a vertical section on the line 2—2 of Figure 1 of the upper portion of the tank, Figure 3 is a fragmentary view in perspective to show a development of the arrangement illustrated in Figures 1 and 2, Figure 4 is a plan view of the preferred construction of apparatus developed from the arrangement shown in Figures 1 and 2 in accordance with the principle illustrated in Figure 3, Figure 5 is a section on the line 5—5 of Figure 4 to show the mixing arrangement, Figure 6 is a section on the line 6—6 of Figure 5, Figure 7 is a section on the line 7—7 of Figure 4 drawn to a larger scale, Figure 8 is a detail on a larger scale of an adjustable weir arrangement shown in Figure 7, Figure 9 is a section on the line 9—9 of Figure 7, showing means for the control of the positional feed of sea water, Figure 10 is a section on the line 10—10 of Figure 9, Figure 11 is a section on the line 11—11 of Figure 7 showing means for the control of the positional feed of milk of lime, Figure 12 is a section on the line 12—12 of Figure 11, and Figure 13 is a detail on a larger scale of a deflector arrangement shown in Figure 4.

Referring to Figures 1 and 2, the precipitation apparatus shown therein comprises a trough 14 arranged so as to be very slightly inclined to the horizontal. At the upper end of the trough 14 a mixing tray 15 is disposed so that the bottoms of the trough and tray are substantially contiguous. The trough is preferably of tongued and grooved close boarded construction with shallow vertical sides 14a which overlap the sides 15a of the mixing tray as shown in Figure 1. The mixing tray may be of stainless steel and may be arranged, as shown in Figure 2, at slightly greater inclination to the horizontal than the trough 14. Adjacent the upper end of the mixing tray are arranged launders 16 and 17 for sea water and a smaller launder 18 for milk of lime below the launder 17. A filter 19 is arranged between the launders 16 and 17 so that sea water fed to the launder 16 through a pipe 20 is filtered before passing into the launder 17. The milk of lime is fed to the launder 18 through a pipe 21. At the front of the sea water launder 17 a substantially vertical plate or weir 22 is provided and sea water from the launder overflows the weir in a shallow stream and mixes on the plate 15 with a similar shallow stream of milk of lime flowing beneath the weir plate 22, a second plate 23 preferably being provided to constitute a weir for the milk of lime. There is a fall of about three inches between the top edge of the weir 22 and the mixing plate 15.

The trough 14 is arranged so that it extends radially over a circular settling tank 24 in the form of an inverted cone and so that an opening 14b in the bottom near the end of the said trough is situated immediately above the apex of the conical bottom of the tank 24 and at such a level that when the tank is filled to the brim with liquid the surface of the latter is at substantially the same level as the bottom of the trough 14. The conical tank 24 may suitably be about thirty feet in diameter and the depth to the apex of the cone may be fifteen feet. The upper rim of the said tank may be provided with an overflow launder 25.

In operation the sea water is caused to flow into the launder 16 and thence to the launder 17 and overflows at the plate or weir 22 and falls the short distance of three inches into the milk of lime liquor which is conducted along the mixing plate 15. The mixed liquors then flow in a shallow stream to the end of the trough 14 above the apex of the conical settling tank 24. By this time the rate of flow of the mixed liquors has been reduced almost to a standstill by contact with stationary water in the lower end of the trough, so that the suspended magnesium hydroxide quietly settles and falls through the opening 14b in the trough and is collected at the apex of the settling tank which may be provided with a suitable opening for withdrawal of the magnesium hydroxide sludge.

The sea water before use in the process according to the invention may, in addition to being filtered by passage through the filter 19, be treated in known manner to remove impurities. The milk of lime may be prepared by slaking burnt lime or dolomite with fresh water and is then diluted to a milk of lime either with fresh water or with a proportion of sea water. The milk of lime is preferably hydraulically classified and strained to remove solid particles. The degree of dilution of the milk of lime is arranged to accord with the flow of the sea water down the trough 14 to the settling tank, so that just sufficient lime for the reaction is added to the sea water to be reacted.

By the process according to the invention very intimate mixing results and, as far as can be determined, reaction between the sea water and lime is practically instantaneous; at any rate, no free lime can be detected within the zone immediately following the reaction plane, that is to say as the mixed liquors pass through the opening 14b.

The precipitated magnesium hydroxide sinks through the body of the water to the bottom of the conical tank 24, whilst the reacted sea water flows to the rim of the settling tank where it discharges into the launder 25 and thence to waste. The slurry that accumulates in the bottom of the conical settling tank may be removed either by an external pipe connected to the point of the cone or by means of a pump the inlet pipe of which is located inside the point of the cone. The slurry thus obtained may be washed immediately with fresh water, or may first be thickened by settling in tanks. In either case washing is necessary to free the slurry as soon as possible from sodium chloride and reacted sea water. It is preferred to settle the slurry first which can increase its concentration to approximately ten per cent of solids. This concentrated slurry may be washed counter-currently or by any other known method and may thereafter be subjected to further settling or may be filtered.

If desired, of course, in the arrangement already described the milk of lime could be caused to flow over the upper weir 22 with the sea water forming the lower stream. Such a modification is shown in Figure 3 of the drawings which also illustrates how the mixing arrangement already described with reference to Figures 1 and 2 may be developed to give more economic utilisation of the space occupied by the settling tank 24. In this development the sea water and lime launders extend completely round the periphery of the settling tank and the horizontal dimensions of the trough are increased to the maximum, the trough thereby assuming the form of an annulus. In this arrangement an annular launder 26 for lime slurry is set in a wider annular launder 27 which contains the sea water. The inner walls 26a and 27a of the lime and sea water launders respectively are of less height than the outer walls and consequently form weirs for the lime and sea water contained in the respective launders. The milk of lime overflowing the weir 26a flows inwardly over a skirt 28 and then falls a distance of about three inches on to a skirt 29 over which a shallow stream of sea water flows from the launder 27. The mixed streams flow radially inwards over the skirt 29 towards the centre of the settling tank as before. The skirt 29 may be regarded therefore as the equivalent of the mixing plate 15 and trough 14 developed horizontally over 360° so that side walls, such as 14a and 15a become unnecessary.

A preferred construction of apparatus developed in accordance with the principle described with reference to Figure 3 is illustrated in Figures 4 to 13 of the drawings. In this construction an annular launder 26 for the lime slurry is set in a wider annular launder 27 for the sea water as before, the launder 26 being set somewhat off-centre with respect to the sea water launder for a purpose to be described. Both launders have adjustable overflow weirs delivering on to skirts slightly inclined to the horizontal, the skirt 28 for the lime being above and delivering on to the skirt 29 for the sea water. The skirt 29 has a central opening through which the mixed liquors pass into the main settling tank, not shown. The adjustable overflow weir for the sea water launder 27 consists of a brass weir plate 30, Figure 8, which is bolted to the inner wall 27a of the sea water launder, the bolts 31 passing through vertically elongated slots 32 in the weir plate to allow for adjustment of the plate relatively to the wall 27a. The bolts 31 also afford a means of attaching brackets 33 to the wall 27a for the support of the sea water skirt 29 which is preferably of wooden construction as described with reference to Figures 1 and 2. The adjustable overflow weir for the milk of lime consists of a brass weir plate 34 and similar means are provided for its adjustment vertically relative to the wall 26a of the lime launder. In addition the lime skirt 28, which may be of stainless steel as before, is adjustable for height relatively to the wall 26a. This adjustment is effected by releasing set screws 35 and raising or lowering angle members 36 (upon which the lime skirt 28 is carried) in the vertical slots formed between the wall 26a and brackets 37 after which the set screws are operated to secure the angle members 36 in the set position.

Sea water is supplied to the launder 27 through a sea water feed launder 38, Figure 5, and milk of lime to the lime launder 26 by means of a lime feed pipe 39. In order to ensure even distribution of the milk of lime in the launder 26 the lime feed pipe 39 is aranged to supply a pair of downwardly bent cross pipes 40 and 41 each of which supplies a horizontal pipe 42 the downwardly turned ends 42a of which dip into the lime launder at intervals of approximately 90° as will be seen by reference to Figure 4. The lime feed pipe 39 is carried by a launder truss 43 supported on a pier 44 in the centre of the settling tank, not shown, and carrying an associated circular launder truss 45 which is provided for the rigid mounting of the launders 26 and 27 and associated structure.

For ensuring even distribution of the sea water circumferentially within the sea water launder 27 deflectors 46, Figures 4, 5 and 13, are provided. These deflectors are in the nature of vertical vanes 47, Figure 13, pivoted upon vertical axes 48 at the ends of volute partitions 49 which split the sea water launder into distinct parts, each part serving a specific segment of the complete launder annulus. Means are provided, as indicated at 50 in Figure 13, for setting the vanes in the positions to which they are adjusted. By the provision of the volute partitions 49 and the offset arrangement of the lime launder 26 in the sea water launder 27 it is possible by adjustment of the deflectors 47 to obtain even distribution of the sea water throughout all segments of the launder 27. Means are also provided for the positional control of the outflow of sea water from the launder 27. Such means comprise movable baffle plates 51, Figures 9 and 10, adapted to be hung on the outer wall 26b of the lime launder 26. By varying the number of these baffle plates on any particular portion of the wall 26b regulation is effected of the area in a vertical plane of the space between the bottoms of the launders 26 and 27 through which the sea water passes to its overflow weir 30 as indicated by the lower series of arrows in Figure 7. Similar means are provided for controlling the positional outflow of the milk of lime from the launder 26. For this purpose the latter is provided with an internal partition 52, Figures 7, 11 and 12, terminating short of the bottom of the launder and movable baffle plates 53 are associated with this partition, in the manner already described with reference to the sea water launder, to regulate the vertical area of the space between the lower edge of the partition 52 and the bottom of the launder through which the milk of lime has to pass on its way to the overflow weir 34, as shown by the upper series of arrows in Figure 7.

Around the launders a walkway 54 is provided for inspection of the launders and adjustment of the lime and sea water distribution and outflow arrangements, the walkway being provided with hand-railing 55. The mother liquor is maintained at constant level in the settling tank (by launder overflow), this level being slightly above the lower inner edge of the skirt 29 as already described in respect of the trough 14 and tank 24 of Figures 1 and 2. The precipitated magnesium hydroxide passing through the opening 56, Figure 4, of the annular trough or skirt 29 sinks through the body of mother liquor in the settling tank at the bottom of which it accumulates. The precipitated slurry may be concentrated as already mentioned.

Concentrations of up to 20% solids render the slurry sufficiently plastic to be dried on any standard type of continuous or bench drier and for hydrates of high purity it is preferred to wash the dried hydroxide again until the sodium chloride content is reduced to below 0.1%. By this double washing it is possible to obtain such a low percentage content of sodium chloride that the product is suitable for use as the raw material in the manufacture of magnesium metal by the reduction method.

For the manufacture of magnesium compounds such as chloride, sulphate and carbonate, it will be obvious that the slurry from the settling tank, after washing, can be utilised as the starting or raw material. Thus, for the manufacture of magnesium chloride the washed slurry may be treated with hydrochloric acid; for sulphate with sulphuric acid and for carbonate the slurry may be diluted and carbon dioxide bubbled through.

What I claim and desire to secure by Letters Patent is:

1. A process for the production of magnesium hydroxide from liquors containing convertible magnesium salts by precipitation with a basic reacting liquor, which comprises, forming two streams of the liquors to flow in the same direction with one of said streams being disposed slightly above the other, said streams being of substantially the same width and of greatly less thickness or depth as compared to their width, causing said streams to converge and intermingle into a single stream flowing in the same direction and in a plane inclined very slightly from the horizontal, and adjusting the rate of flow in each case to the respective concentration of magnesium salts and base so that the mixed liquors are substantially free from magnesium ions.

2. A process for the production of magnesium hydroxide from liquors containing convertible magnesium salts by precipitation with a basic reacting liquor, which comprises, forming two streams of the liquors to flow in the same direction with one of said streams being disposed slightly above the other, said streams being of substantially the same width and of greatly less thickness or depth as compared to their width, causing said streams to converge and intermingle into a single stream flowing in the same direction and in a plane inclined very slightly from the horizontal, adjusting the rate of flow in each case to the respective concentration of magnesium salts and base so that the mixed liquors are substantially free from magnesium ions, and causing said single stream to flow into the upper surface of a quiescent body of mother liquor in such manner that said stream is reduced almost to a standstill by contact with the mother liquor, whereby rapid settling and consequently rapid separation of the precipitate from the mother liquor is effected.

FRANCIS NORMAN PICKETT.